United States Patent [19]

Kinsley, Jr.

[11] Patent Number: 4,917,714

[45] Date of Patent: Apr. 17, 1990

[54] FILTER ELEMENT COMPRISING GLASS FIBERS

[75] Inventor: Homan B. Kinsley, Jr., Powhatan, Va.

[73] Assignee: James River Corporation, Richmond, Va.

[21] Appl. No.: 281,384

[22] Filed: Dec. 8, 1988

[51] Int. Cl.[4] ............................................. B01D 46/02
[52] U.S. Cl. ......................................... 55/524; 55/527; 55/528; 55/DIG. 44; 162/146; 162/207
[58] Field of Search ............... 55/522, 524, 527, 528, 55/DIG. 5, DIG. 44; 162/145, 146, 207

[56] References Cited

U.S. PATENT DOCUMENTS

| | | | |
|---|---|---|---|
| 2,784,132 | 3/1957 | Maisel | 55/524 X |
| 3,573,158 | 3/1971 | Pall et al. | 55/524 X |
| 3,871,850 | 3/1975 | Lenane | 55/528 X |
| 3,920,428 | 11/1975 | Kinsley, Jr. | 55/528 |
| 3,937,860 | 2/1976 | Gusman et al. | 55/528 X |
| 4,100,323 | 7/1978 | Forsten | 55/528 X |
| 4,225,642 | 9/1980 | Hirakawa | 55/528 X |
| 4,286,977 | 9/1981 | Klein | 55/524 |
| 4,293,378 | 10/1981 | Klein | 162/146 X |
| 4,318,774 | 3/1982 | Powell et al. | 162/146 X |
| 4,491,502 | 1/1985 | Martin, Jr. | 162/146 |
| 4,536,439 | 8/1985 | Forsten | 55/528 X |
| 4,595,457 | 6/1986 | Nishiyama et al. | 162/146 X |
| 4,643,182 | 2/1987 | Klein | 55/524 X |
| 4,698,267 | 10/1987 | Tokarsky | 162/146 X |
| 4,710,520 | 12/1987 | Klein | 55/524 X |
| 4,713,285 | 12/1987 | Klein | 55/524 X |
| 4,729,921 | 3/1988 | Tokarsky | 162/146 X |
| 4,734,321 | 3/1988 | Radvan et al. | 162/146 X |
| 4,752,355 | 6/1988 | Provost | 162/146 X |
| 4,765,812 | 8/1988 | Homonoff et al. | 55/528 X |
| 4,765,915 | 8/1988 | Diehl | 55/524 X |

Primary Examiner—Robert Spitzer
Attorney, Agent, or Firm—Burns, Doane, Swecker & Mathis

[57] ABSTRACT

Provided is a strong, flexible filter element comprising a wet laid non-woven element of glass fibers, synthetic short fibers, and polymer fibrids having a softening point below the softening point of the short fibers. In the filter element, the glass fibers are bound to the synthetic short fibers, e.g., aromatic polyamide short fibers such as poly(m-phenylene isophthalamide) short fibers, by the polymer fibrids, e.g., cellulose acetate fibrids, which act as a binder. The filter element exhibits excellent chemical resistance and a usefulness in removing particulates from gases at temperatures below 400° F.

19 Claims, 1 Drawing Sheet

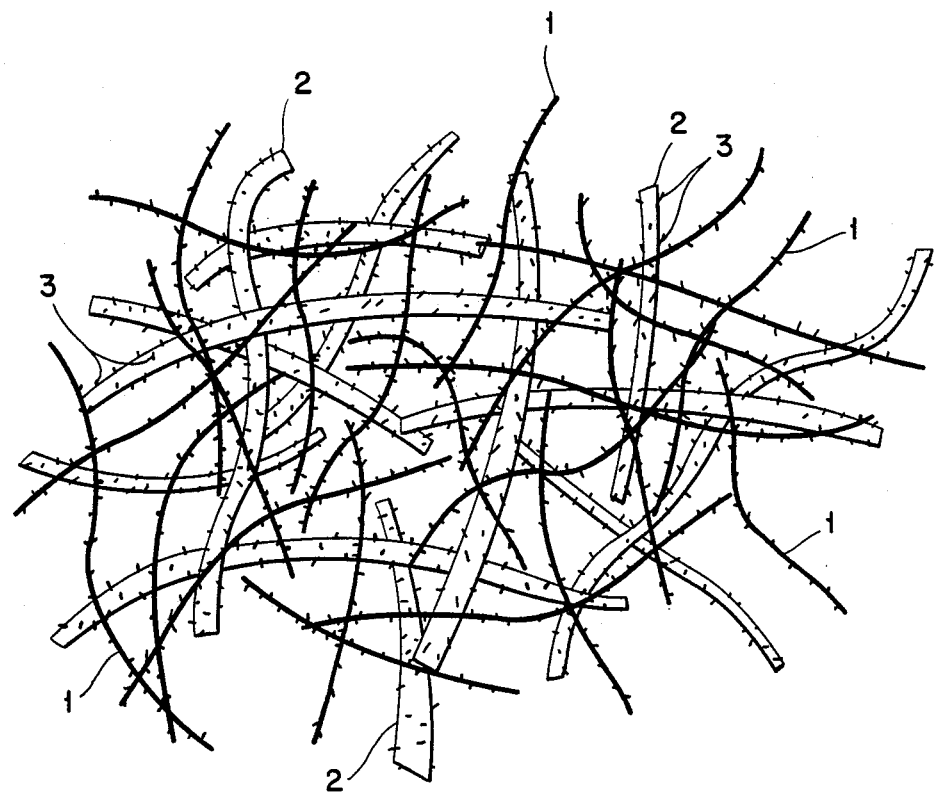

FILTER ELEMENT COMPRISING GLASS FIBERS

BACKGROUND OF THE INVENTION

This invention relates to the field of non-woven filter elements, and, in particular, filters composed of glass fibers, synthetic short fibers, and polymer fibrids.

The production of a papery product using synthetic fibers is well known. For example, a papery product employing a synthetic fiber such as polyester or nylon or a chemical fiber such as rayon is known. The bonding or matting of such a fiber using a binder, such as a suitable resin, is also known.

A particular type of papery product is that formed mainly of a fiber made of a wholly aromatic polyamide, especially, poly-m-phenylene isophthalamide. Such a product is excellent in its heat-resisting properties and flame retardant properties. For example, in Japanese Patent Publication No. 35-11851, a poly-m-phenylene isophthalamide solution in an amide polar solvent is dispersed into a dispersing medium formed mainly of water to prepare a thin foliated body having a specific configuration, the thin foliated body is then mixed and intertwined with a fiber in water and dried, and the materials are subjected to heat and pressure to prepare a papery product. According to this method, a papery product which is compact in structure and excellent in its electrical insulating property can be obtained, but since the process for preparing the thin foliated body and the papermaking step use a large amount of liquid, this method requires a considerably large amount of energy in the solvent recovery step and the drying step.

To solve this problem, it has been suggested to produce a papery product of high density without employing a papermaking process, which requires the use of a specific binder and a complicated system. It has also been proposed to apply heat and pressure to wholly aromatic polyamide fibers having a low degree of orientation and a low degree of crystallinity (Japanese Laid-open Patent Application No. 52-105975). However, according to this method, since the wholly aromatic polyamide fiber used is inferior in mechanical strength and heat-resistance, the thus obtained papery product inevitably has poor mechanical strength and poor heat-resistance.

U.S. Pat. No. 4,398,995 relates to a papery product composed of a fibrous web, at least part of which is made up of wholly aromatic polyamide fibers having a readily soluble skin layer and a sparingly soluble or insoluble core layer. In forming the web, the skin layer is softened and fuses the polyamide fibers. The papery product may, optionally, include fibers of glass and cellulose acetate. The method of forming papery products in accordance with this patent involves complicated treatment steps to form the core/shell polymer fiber used in the formation of the papery product. This renders the product extremely expensive, and hence impractical, to manufacture.

A combination of glass fibers and aromatic polyamide fibers is disclosed in U.S. Pat. No. 3,920,428. This patent relates to a filter element adapted to remove particulate from the exhaust of an internal combustion engine comprising a non-woven mat of glass fibers fused with aromatic polyamide fibers. More specifically, the aromatic polyamide fibers may be mixtures of fibrids and short fibers as described in U.S. Pat. No. 3,756,908. However, while the materials described in U.S. Pat. No. 3,920,428 may be satisfactory for high temperature applications, it is not a very economically suitable filter under the contemplated circumstances. Moreover, such a filter element is found to exhibit decreased permeability and a low void fraction.

There remains a need, therefore, for an inexpensive and practical filter which is suitable for low temperature applications, and which requires low amounts of energy to provide a strong, yet flexible filter element which has a relatively high void fraction.

SUMMARY OF THE INVENTION

It is therefore an object of the present invention to provide a strong yet flexible non-woven filter element which is ideally suited for use at lower temperatures.

Still another object of the present invention is to provide a flexible, non-woven filter element which is of increased permeability, and which is strong and ideally suited for use at lower temperatures.

Yet another object of the present invention is to provide an inexpensive, practical filter element having minimal energy requirements for its manufacture.

These and other objects, which will become apparent to the skilled artisan upon a review of the detailed description of this invention, the drawing and the claims appended hereto, are accomplished by a non-woven filter element according to the present invention.

In accordance with the present invention, there is provided a filter element of high strength and good flexibility and permeability which is ideally suited for use at lower temperatures, and particularly temperatures below 400° F. The filter element of the present invention is comprised of a wet laid non-woven mat of (i) glass fibers, (ii) synthetic short fibers, e.g., aromatic polyamide short fibers and (iii) polymer fibrids having a softening point below the softening point of the short fibers. The synthetic short fibers are believed bound to the glass fibers by the polymer fibrids, which act as a binder. The resulting filter exhibits good strength and flexibility, improved permeability and can be manufactured in an efficient and cost effective manner. These filter elements are particularly well suited for use in lower temperature filtering applications.

BRIEF DESCRIPTION OF THE DRAWING

The FIGURE of the Drawing is a plan view of a portion of a non-woven fiber mat of this invention.

DESCRIPTION OF THE PREFERRED EMBODIMENTS

The present invention provides a filter element of high strength and good flex which is useful in the filtration of particulates from a medium at lower temperatures, i.e., around 400° F. or less, said filter element comprising a non-woven mat of glass fibers, synthetic short fibers, and polymer fibrids having a softening point below the softening point of the short fibers. In the non-woven mat, the short fibers are believed bound to said glass fibers by use of the polymer fibrids as a binder. It should be noted, however, that the contribution of the fibrids is believed more than just as a binder. The polymer fibrids also add to the unique structural and physical characteristics of the filter mat of the instant invention. It is the combination of components which renders the practice of the present invention so advantageous.

The first component of the non-woven mat is the glass fibers. The glass fibers can generally have any diameter, but preferably from about 0.05-15 microns and lengths from about ¼ to 3 inches. The glass fibers can comprise macro fibers, micro fibers or a mixture thereof.

In one preferred embodiment, the glass fibers are a mixture of glass macro fibers having a diameter of about 6-15 microns, and glass micro fibers having a diameter of about 0.05-2 microns, and most preferably about 0.6 micron. The macro fiber can be of any length up to about 3 inches or more, while the micro fibers are preferably less than one inch, and more preferably less than ¼ inch long. For example, good results are obtained using micro fibers of about 0.6 micrometers in diameter and about 1/16 through ¼ inch in length. During blending they may became chopped up into random lengths. Mixtures containing about 50-90 weight percent macro fibers and 10-50 weight percent micro fibers relative to the total glass fiber content are preferred.

The second component of the non-woven mat is the synthetic short fiber. Among the useful synthetic (man made) fibers for the present invention are the aromatic polyamide short fibers, as well as short fibers of polybenzimidazole, polyphenylene sulfide, polyamides (nylons), polyesters, liquid crystal polymers, polypropylene or carbon short fibers. The most preferred short fiber, however, is that of an aromatic polyamide short fiber. The term aromatic polyamide includes wholly aromatic polyamides as well as non-wholly aromatic polyamids, both of which are contemplated. Examples of suitable aromatic polyamides are described in U.S. Pat. No. 3,094,511 and British U.S. Pat. No. 1,106,190, which are incorporated herein by reference.

The preferred wholly aromatic polyamide usable for the present invention contains repeating units of formulae (I1) and (II),

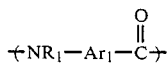 (I)

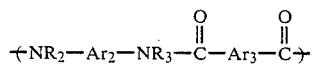 (II)

wherein $Ar_1$, $Ar_2$ and $Ar_3$ respectively represent, independently from each other, an unsubstituted or substituted divalent aromatic radical which comprises a single aromatic ring, or two or more aromatic rings that are condensed together, or are linked together by a single bond, or by a bridging atom or radical, and which is oriented either meta or para, and $R_1$, $R_2$ and $R_3$ respectively represent, independently from each other, a hydrogen atom or an alkyl radical having 1 to 3 carbon atoms.

In the formula (I) and (II), it is preferable that $Ar_1$, $Ar_2$ and $Ar_3$ be respectively selected, independently from each other, from the group consisting of the radicals of the formulae:

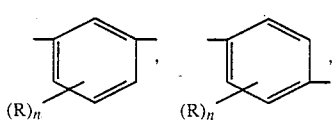

-continued

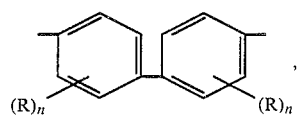

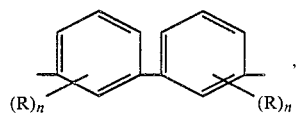

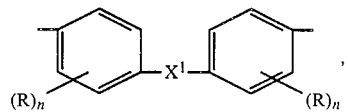

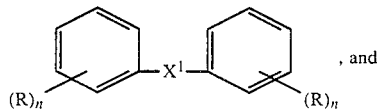, and

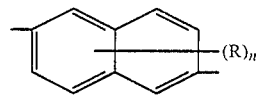

wherein R represents a member selected from the group consisting of lower alkyl radicals having 1 to 6 carbon atoms, lower alkoxy radicals having 1 to 6 carbon atoms, halogen atoms and a nitro radical, n represents zero or an integer of from 1 to 4 and $X_1$ represents a member selected from the group consisting of:

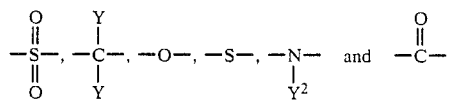

wherein $Y^2$ represents a member selected from the group consisting of a hydrogen atom and a lower alkyl radicals having 1 to 6 carbon atoms.

Also, in the formulae (I) and (II), it is more preferable that $Ar_1$, $Ar_2$ and $Ar_3$ respectively represent, independently from each other, a member selected from p-phenylene radical, m-phenylene radical, biphenylene and radicals of the formulae:

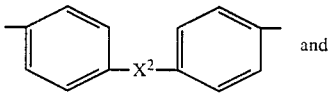 and

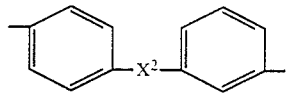

wherein $X^2$ represents a member selected from

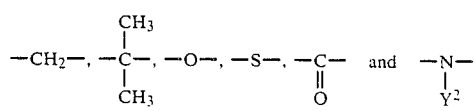

in which $Y^2$ represents a hydrogen atom or an alkyl radical having 1 to 3 carbon atoms.

Furthermore, in the formulae (I) and (II), it is still more preferable that $Ar_1$, $Ar_2$ and $Ar_3$ be respectively a p-phenylene or m-phenylene radical.

Moreover, it is preferred that the aromatic polyamide contain the repeating unit of the formula (II) in which $Ar_2$ and $Ar_3$ are respectively a p-phenylene or m-phenylene radical, most preferably, a m-phenylene radical.

The aromatic polyamide may contain 30 molar % or less of one or more comonomers, for example, aliphatic diamines, such as hexamethylene diamine and piperazine, and aliphatic dicarboxylic acid, such as adipic acid, based on the entire molar amount of the comonomers contained in the polyamide. The preferred aromatic polyamides are those having a softening temperature above about 350° C. Examples include:

poly(4,4'-diphenylene terephthalamide)
poly(3,3'-dimethyl-4,4'-diphenylene terephthalamide)
poly(ethylene terephthalamide)
poly(4,4'-methylenediphenylene terephthalamdie)
poly(4,4'-diphenylene isophthalamide)
poly(4,4'-methylenediphenylene isophthalamide)
poly(trimethylene terephthalamide)
poly(m-phenylene isophthalamide)
poly(ethylene-N,N,-dimethylterephthalamide)
poly(3,3'-dimethyl-4,4'-methylenediphenylene terephthalamide)
poly(p-xylene terephthalamide)
poly(3,3'-dimethyl-4,4'-diphenylene isophthalamide)

The most preferred aromatic polyamide is poly(m-phenylene isophthalamide), which is commercially available under the name "Nomex",(Reg. trademark E. I. du Pont Company).

The synthetic short fibers of the present invention can have about any conventional fiber diameter and length. The preferred polymer fibers used in making the filter element are those conventionally used to make synthetic papers. These short fibers are referred to as "floc" and comprise fibers less than one inch in length, and generally about 0.25 inch in length.

It has been found in the practice of the present invention that when glass fibers are heated with the synthetic short fibers and the polymer fibrids of the present invention, even at temperatures generally below 500° F., the fibrids soften and deform around the glass fibers and the short fibers, thereby binding them to each other. The resulting filter exhibits good strength and flexibility, and also exhibits improved permeability after the heat treatment.

The fibrids according to the present invention are small, non-granular, non-rigid, fibrous or film-like particles. Two of their three dimensions are on the order of microns. Their smallness and suppleness allows them to be deposited in physically entwined configurations such as the fiber mat. The polymer fibrids of the present invention also have a softening point below the softening point of the synthetic short fibers used. Thus, when heat is applied to a fibrous mixture of glass fibers, synthetic short fibers and the polymer fibrids, the fibrids deform and bind the short fibers to the glass fibers, forming a mat. The fibrids may be composed of any polymeric material so long as its softening point is below the softening point of the aromatic synthetic short fibers. In a preferred embodiment of the present invention, the polymer fibrids are comprised of cellulose acetate fibrids.

The ratio of glass fibers to polymer fibers can vary widely. A useful range is from about 30–95 weight percent glass fiber and from about 5–70 weight percent of a mixture of synthetic short fibers and polymer fibrids.

Excellent filters can be made in a preferred embodiment using a mixture of glass micro fibers, poly(m-phenylene isophthalamide) short fibers and cellulose acetate fibrids. Preferably the glass micro fibers are in the 0.05–2 micron range, and more preferably in the 0.6 through 1.6 micron range. From about 5 to about 70 weight percent of the mat·can be poly(m-phenylene isophthalamide) short fibers and cellulose acetate fibrids, and the balance glass micro fibers. More preferably, from about 10–50 weight percent of the mat is poly(m-phenylene isophthalamide) short fibers and cellulose acetate fibrids and the balance glass micro fibers having a diameter of about 0.6–1.6 microns.

Referring to the FIGURE of the Drawing, the filter element is seen to be a random nonwoven mat of glass macro fibers 1, aromatic polyamide short fibers 2, and polymer fibrids 3, e.g., cellulose acetate fibrids. The polyamide short fibers 2 are bonded to the glass macro fibers 1 by the melting fibrids 3, thus binding the mat into a unitary flexible filter element of high strength.

The filter element of the present invention can be generally made by (a) forming an aqueous slurry of glass fibers and polymer fibers, (b) filtering the aqueous slurry to form a non-woven mat, and (c) then heating the web for a short period of time to a temperature which is at or above the melting temperature of the polymeric fibrid. With cellulose acetate, good results are obtained by heating the dried web or pad in an oven set at about 525 to 575 degrees F. A mechanical device with more positive means of heat transfer than an oven will, of course, bond the sheet more rapidly and at a lower temperature. Once the sheet is heated to the melting temperature of the fibrid, the melting occurs almost instantaneously.

Useful filter elements can be prepared using a hand sheet mold or, for example, a Fourdrinier machine.

The filter element thickness is determined by the thickness of the web laid down on the wire. Filter porosity can be varied by varying the amount of glass micro fibers used in the filter. This is illustrated by the following prophetic examples.

EXAMPLES 1–13

A series of filter elements can be made from an aqueous slurry of glass macro fibers (6.5 microns, 0.25 inch long), glass fibers (about 0.6 microns) and a mixture of poly(m-phenylene isophthalamide) short fibers and cellulose acetate fibrids. The short fibers can be prepared, for example, by disintegrating a synthetic poly(m-phenylene isophthalamide) paper in a Waring blender. All the ingredients can then be combined in the slurry and blended further.

The filter sheets can be made from the furnish by filtering the furnish on a 150 mesh wire. The wet pad can be couched with dry blotters, removed from the wire, and oven dried. The resultant pad can then be heat-bonded by placing in a convection oven at 550° F. for about 10 minutes. (If an efficient positive heat transfer means is employed, the heat-bonding may be substantially instantaneous.)

The following table exemplifies various proportions of the foregoing components (in percentage by weight)

useful in preparing filter elements in accordance with the present invention.

| Filter Element | Glass macro fiber | Glass micro fiber | Short Fiber | Fibrid |
|---|---|---|---|---|
| 1 | 70 | 0 | 10 | 20 |
| 2 | 60 | 0 | 10 | 30 |
| 3 | 50 | 0 | 10 | 40 |
| 4 | 60 | 0 | 20 | 20 |
| 5 | 50 | 0 | 20 | 30 |
| 6 | 40 | 0 | 20 | 40 |
| 7 | 50 | 0 | 30 | 20 |
| 8 | 40 | 0 | 30 | 30 |
| 9 | 30 | 0 | 30 | 40 |
| 10 | 45 | 5 | 30 | 20 |
| 11 | 40 | 10 | 30 | 20 |
| 12 | 35 | 5 | 30 | 30 |
| 13 | 30 | 10 | 30 | 30 |

The principles, preferred embodiments and modes of operation of the present invention have been described in the foregoing specification. The invention which is intended to be protected herein, however, is not to be construed as limited to the particular embodiments disclosed, since these are to be regarded as illustrative rather than restrictive. Variations and changes may be made by others without departing from the spirit and scope of the invention.

What is claimed is:

1. A filter element of high strength and good flex and permeability comprising a non-woven mat of (i) glass fibers, (ii) synthetic short fibers and (iii) polymer fibrids having a softening point below the softening point of said short fibers, said short fibers being bound to said glass fibers by the polymer fibrids.

2. The filter element of claim 1, wherein said glass fibers comprise glass micro fibers having a diameter of about 0.05–2 microns.

3. The filter element of claim 2, wherein from about 5–70 weight percent of said element is comprised of said short fibers and polymer fibrids.

4. The filter element of claim 3, wherein about 10–50 weight percent of said element is comprised of said short fibers and polymer fibrids.

5. The filter element of claim 1, wherein said glass fiber is a mixture of glass macro fibers having a diameter of 6–15 microns and glass micro fibers having a diameter of 0.05–2 microns.

6. The filter element of claim 5, wherein about 50–90 per cent of said glass fibers are macro fibers and about 10–50 percent of said glass fibers are said micro fibers.

7. The filter element of claim 1, wherein said synthetic short fibers are comprised of an aromatic polyamide, polybenzemidazole, polyphenylene sulfide, nylon, polyester, liquid crystal polymer, polypropylene or carbon fiber.

8. The filter element of claim 7, wherein said short fiber is poly(m-phenylene isophthalamide).

9. The filter element of claim 1, wherein said polymer fibrids are comprised of a polymer fibrid having a melting point of less than about 650° F.

10. The filter element of claim 9, wherein said polymer fibrids are essentially cellulose acetate fibrids.

11. A filter element of high strength and good flex useful in the filtration of particulates from a medium at temperatures below 400° F., said filter element comprising a non-woven mat of (i) glass fibers, (ii) aromatic polyamide short fibers and (iii) polymer fibrids, said short fibers being bound to said glass fibers by use of said polymer fibrids as a binder, and said polymer fibrids being cellulose acetate.

12. The filter element of claim 11, wherein said glass fiber is a glass micro fiber having a diameter of about 0.05–2 microns.

13. The filter element of claim 12, wherein from about 5–70 weight percent of said mat is said short fibers and polymer fibrids.

14. The filter element of claim 13, wherein about 10–50 weight percent of said mat is comprised of said short fibers and polymer fibrids.

15. The filter element of claim 11, wherein said glass fibers are a mixture of glass macro fibers having a diameter of 6–15 microns and glass micro fibers having a diameter of 0.05 to 2 microns.

16. The filter element of claim 15, wherein about 50–90 per cent of said glass fibers are said macro fibers and about 10–50 percent of said glass fibers are said micro fibers.

17. The filter element of claim 11, wherein the aromatic polyamide short fiber is poly(m-phenylene isophthalamide).

18. A system for removing particulates from a gas comprising a filtration housing having an inlet and an outlet, said inlet being operatively connected to receive said gas, a passage within said housing from said inlet to said outlet and a filter element of claim 1 completely across said passage whereby said gas passing from said inlet to said outlet passes through said filter element.

19. A system for removing particulates from a gas comprising a filtration housing having an inlet and an outlet, said inlet being operatively connected to receive the gas, a passage within said housing from said inlet to said outlet and a filter element of claim 11 completely across said passage whereby said gas passing from said inlet to said outlet passes through said filter element.

* * * * *